United States Patent [19]

French

[11] Patent Number: 4,660,185

[45] Date of Patent: Apr. 21, 1987

[54] METHOD FOR DETERMINING THE ABSOLUTE LOCATION OF A STREAMER INCORPORATING A REFERENCE SIGNAL SYSTEM WHERE THE A PRIORI LOCATION OF THE REFERENCE SIGNAL SOURCE (OR ALTERNATIVELY THE DETECTOR) NEED NOT BE KNOWN

[75] Inventor: William S. French, Covington, La.

[73] Assignee: Tensor Geophysical Service Corporation, Metairie, La.

[21] Appl. No.: 694,070

[22] Filed: Jan. 23, 1985

[51] Int. Cl.$^4$ .............................................. G01V 1/38
[52] U.S. Cl. ........................................ 367/19; 367/130
[58] Field of Search ................. 367/16, 19, 20, 106, 367/117, 130, 907; 114/253

[56] References Cited

U.S. PATENT DOCUMENTS

| | | | |
|---|---|---|---|
| 3,292,141 | 11/1964 | Hines | 367/21 |
| 3,953,827 | 4/1976 | LeMoal | 367/19 |
| 4,068,208 | 1/1978 | Rice | 367/19 |
| 4,231,111 | 10/1980 | Neeley | 368/10 |
| 4,301,523 | 11/1981 | Meland | 367/19 |
| 4,376,301 | 3/1983 | Roberts | 367/19 |
| 4,404,664 | 9/1983 | Zachariadis | 367/19 |

FOREIGN PATENT DOCUMENTS 2138942 10/1984 United Kingdom ................. 367/19

*Primary Examiner*—Nelson Moskowitz
*Assistant Examiner*—Ian J. Lobo
*Attorney, Agent, or Firm*—Vaden, Eickenroht, Thompson & Boulware

[57] ABSTRACT

A method for determining the absolute geophysical location of a streamer using reference signal source(s), or alternately detector(s), of unknown location. The absolute geophysical location of a seismic streamer is determined by the optimal sequential use of the field measurements of reference signal travel time, streamer magnetic heading and conventional navigational measurement. The absolute location determination is accomplished in three steps. Each step solves for one aspect of streamer location by optimally utilizing one of three types of field measurement. This procedure requires no a priori knowledge of the absolute location of the reference signal source(s), or alternately detector(s).

6 Claims, 1 Drawing Figure

METHOD FOR DETERMINING THE ABSOLUTE LOCATION OF A STREAMER INCORPORATING A REFERENCE SIGNAL SYSTEM WHERE THE A PRIORI LOCATION OF THE REFERENCE SIGNAL SOURCE (OR ALTERNATIVELY THE DETECTOR) NEED NOT BE KNOWN

FIELD OF THE INVENTION

This invention pertains to procedures for determining the absolute geophysical location of a streamer.

BACKGROUND OF THE INVENTION

Determining the absolute geophysical location of a streamer is of prime importance, among other applications, in marine seismic data acquisition. In order to properly use marine seismic reflection data it is critical that the absolute geophysical location of the receiving hydrophone arrays of a towed streamer be accurately known. Methods currently practiced for determining the absolute location of a streamer require (1) knowledge of the absolute location of the towing vessel,
(2) knowledge of the magnetic heading of the streamer at several points along the streamer,
(3) knowledge of the relative location of reference signal detecting devices at several points along the streamer, and
(4) knowledge of the absolute location of reference signal source(s) either relative to the seismic vessel or relative to a fixed absolute coordinate system.

Since according to the prior art it is necessary to know the absolute location of the reference signal source(s), the reference signal source(s) are either placed near the boat (thus losing triangulation accuracy for the more distant portions of the streamer) or are towed in the near vicinity of a second marine vessel, the second vessel also being equipped with a maritime navigation system (thus considerably increasing the expense of the seismic survey).

It is a feature of the present invention to accurately determine the absolute geophysical location of a streamer in an improved manner wherein independent a priori knowledge of the absolute location of reference signal source(s) (or alternately of reference signal detectors) is not required, thus eliminating a great cause of expense and error.

It is a further feature of the present invention to recognize that streamer location can be absolutely determined in an improved manner by breaking such determination into three steps, each of the steps being accurately achieved by utilizing one characteristically appropriate type of field measurement.

SUMMARY OF THE INVENTION

The method for the absolute location of a streamer disclosed herein involves an optimum sequential use of reference signal travel time measurements (measurements of signal travel time between a reference signal source and a reference signal detector, one of which occupies a known position along the streamer), compass measurements of magnetic heading from point(s) on the streamer, and conventional maritime navigational measurement. The relative configuration of the streamer is determined by using the travel time measurements. The angular orientation of the streamer coordinate system relating to magnetic heading is determined by using streamer magnetic heading measurements. The absolute geophysical location of the center of the streamer coordinate system is determined by using conventional navigational measurement.

BRIEF DESCRIPTION OF THE DRAWINGS

So that the manner in which the above-recited features, advantages and objects of the invention, as well as others which will become apparent, are attained and can be understood in detail, more particular description of the invention briefly summarized about may be had by reference to the embodiment thereof which is illustrated in the drawings, which drawings form a part of this specification. It is to be noted, however, that the appended drawings illustrate only a typical embodiment of the invention and are therefore not to be considered limiting of its scope as the invention may admit to other equally effective embodiments.

The FIGURE is an elevated view of a preferred embodiment of Applicant's invention showing the application of Applicant's system to marine seismic data acquisition. A marine seismic vessel tows a seismic streamer containing arrays of seismic hydrophones, several magnetic heading compasses and several reference signal detectors. In addition the vessel tows a reference signal source laterally displaced from the seismic streamer.

DETAILED DESCRIPTION OF THE PREFERRED EMBODIMENT

Figure 1:
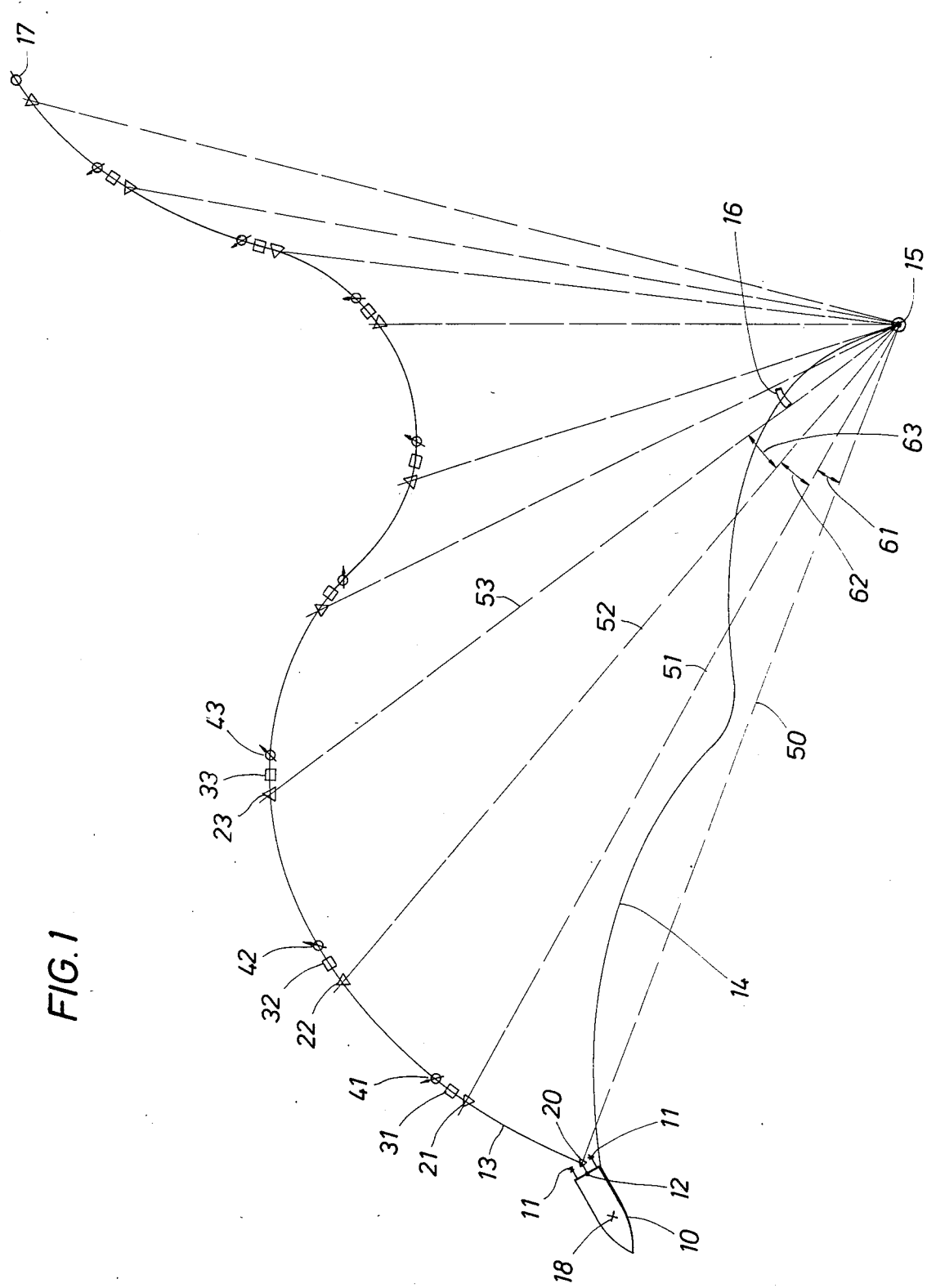

The FIGURE shows a marine seismic vessel 10 towing a seismic streamer 13 including reference signal detectors 20, 21, 22, 23, arrays of seismic hydrophones 31, 32, 33, and magnetic heading compasses 41, 42, 43. A marine seismic source 11 is separately towed by vessel 10 at a location near the vessel. A reference signal source 15 is separately towed by vessel 10 at a location some distance behind the vessel. The reference signal source and reference signal detector are preferably an acoustic source and detector which operate on a high frequency to distinguish them from the seismic source and hydrophones used to record lower frequency acoustic signals as generated by the seismic source 11 and as reflected off geologic interface features. Typically, a streamer will have 120 or 240 arrays of seismic hydrophones with the centers of individual arrays spaced at somewhat uniform intervals, 25 meters or 12.5 meters, along the length of the streamer. Associated with such arrays along the streamer may be 10 to 20 reference signal detectors and 10 to 20 magnetic compasses. The distances between all the components of the streamer are carefully recorded when the streamer is manufactured and when the streamer is deployed. Note that as long as the location on the streamer of each magnetic compass and signal detector is known, there is no requirement that they be associated with the hydrophone arrays. The reference signal source 15 is towed by cable 14 at a distance behind the boat approximately one-half the length of the streamer. A paravane 16 can be used to displace the reference signal source laterally from the streamer, preferably a distance of one-fourth to one-half the length of the streamer itself.

The seismic source is fired periodically and the seismic signal reflections returning to each of the seismic hydrophones are individually transmitted to the vessel by electrical or optical fiber means and are recorded in digital form on magnetic tapes or other recording means. In like manner, the magnetic compass readings and reference signal readings can be individually transmitted to the vessel.

The reference signal source is fired periodically. The reference signal detectors respond to this frequency band and their responses are individually transmitted to the vessel. The time interval between initiation of the source and the arrival of the signal at a particular detector can be determined within one one-thousandth or one ten-thousandth of a second by well-known electronic means. Alternatively, the responses could be displayed at a large scale on a cathode ray tube or other display device and the time between initiation of the acoustic source and the arrival of the acoustic signal at a particular acoustic detector could be manually determined to the same high accuracy.

Simultaneously with the response of the reference signal detectors the streamers' magnetic compass heading is measured and transmitted to the vessel. Also simultaneously the absolute geophysical location of the vessel's navigational antenna is determined by standard navigational techniques.

With the above field measurements carried out as in the preferred embodiment, or by alternate means, the following calculations can be made, even by a small on-board computer:

From the computed individual travel times of the reference signal from reference signal source 15 to each reference signal detector 20, 21, 22, 23, one can calculate the distances 50, 51, 52, 53 using the equation:

$$R = V \Delta T$$

where V is the propagation velocity of the reference signal,
R is the distance from the reference signal source to the reference signal detector, and
$\Delta T$ is the elapsed travel time.

In the preferred embodiment "V", the propagation velocity of the reference signal, is either taken from seasonal charts of the survey area or measured directly using commercially available equipment.

If distances 50, 51, 52, 53 from the reference signal source 15 to each of the reference signal detectors 20, 21, 22, 23 is large compared to the distance between successive reference signal detectors, i.e., between 20 and 21 and between 21 and 22, etc., then one can achieve the required degree of accuracy while making the approximation that the streamer is straight between successive reference signal detectors. This distance will be equal to the carefully recorded distance between components of the streamer when manufactured and when deployed. This assumption is not necessary in general but expedites the specific data reduction calculation defined herein.

Angles 61, 62, 63 subtended at the reference signal source by the straight lines between the reference signal source and each of the reference signal detectors can be calculated according to the relations:

$$\Delta\theta_1 = \cos^{-1} \frac{R_1^2 + R_2^2 - S_{12}^2}{2R_1R_2}$$

$$\Delta\theta_2 = \cos^{-1} \frac{R_2^2 + R_3^2 - S_{23}^2}{2R_2R_3}$$

etc.
where $\Delta\theta_1$ is angle 61, $R_1$ is distance 50,
$R_2$ is distance 51,
$S_{12}$ is the distance between reference signal detector 21 and reference signal detector 20,
$\Delta\theta_2$ is angle 62,
$R_3$ is distance 52,
$S_{23}$ is the distance between reference signal detector 22 and reference signal detector 21.

A smooth curve, which will approximate the relative configuration of the actual streamer, can be fit to the points with radial coordinates $(R_1,\theta)$ $(R_2, \theta+\Delta\theta_1)$, $(R_3, \theta+\Delta\theta_2)$ etc., Here $\theta$ is an arbitrary rotation reference angle and the origin of the radial coordinate, $R=\theta$, is at the position of the reference signal source, which of course has unknown absolute coordinates.

After approximating the relative configuration of the actual streamer with a smooth curve based on travel time data, the arbitrary rotational reference angle $\theta$ of the above streamer coordinate system is next fixed. $\theta$ is chosen such that it minimizes the error between measured compass readings from the actual streamer and predicted compass readings based upon the smooth curve which approximates the relative streamer configuration. As previously noted, the relative compass locations on the streamer are known.

Using maritime navigational techniques well-known in the art, the absolute geophysical location of some point is found, a point which bears a known relation to the actual streamer. In the preferred embodiment the absolute location of the ship's navigational antenna is determined. Since the antenna's relationship with the tow point 12 where the seismic vessel is united with one end of the seismic streamer is known, the absolute geophysical location of one end of the seismic streamer can be determined. A geophysical location is assigned to the origin of the radial coordinate system utilized above such that the location of the corresponding end of the approximated streamer coincides with the one end of the actual seismic streamer whose geophysical location is known. The absolute geophysical location of any point along the entire seismic streamer can now be determined.

There are obvious modifications to the algorithm described above once one is taught the technique of absolute streamer positioning incorporating a reference signal source of a priori unknown position. Furthermore, additional measurements using conventional reference signal triangulation can be incorporated to further increase the accuracy and reliability of the result.

While a particular embodiment of the invention has been shown and described, it will be understood that the invention is not limited thereto, since many modifications may be made and will become apparent to those skilled in the art.

What is claimed is:
1. A method for determining the geophysical location of a streamer which comprises:
 (a) measuring the travel time of a reference signal between a signal source and at least two signal detectors, where the detectors occupy a known location with respect to the length of the streamer;
 (b) obtaining additional travel time measurements, the measurements being related to each other in time;
 (c) measuring the magnetic heading of a point having a known location with respect to the length of the streamer, such measurement being related in time to the travel time measurements;

(d) obtaining additional magnetic heading measurements;
(e) measuring the geophysical location of a reference point having a known location with respect to the length of the streamer, such measurement being related in time to the travel time measurements;
(f) approximating with a curve the relative configuration of the streamer based solely on the travel time measurements, the approximation not being dependent on independent knowledge of the location of the reference signal source;
(g) orienting the configured curve in a coordinate system related to magnetic north based on a plurality of magnetic heading measurements; and
(h) locating the curve in a geophysical coordinate system such that a point that corresponds, in relative location on the curve, to the location of the reference point on the streamer, corresponds in the geophysical coordinate system with the geophysical measurement for the reference point.

2. A method for determining the geophysical location of a seismic streamer as recited in claim 1 wherein the reference signal comprises an acoustic signal.

3. A method for determining the geophysical location of a seismic streamer as recited in claim 1 wherein the reference signal source is laterally displaced from the seismic streamer such that the distances from the reference signal source to the reference signal detectors are as uniform as possible and are an order of magnitude greater than the distance between the reference signal detectors.

4. A method for determining the geophysical location of a streamer which comprises:
(a) measuring the travel time of a reference signal between a signal detector and at least two signal sources, where the signal sources occupy a known location with respect to the length of the streamer;
(b) obtaining additional travel time measurements, the measurements being related to each other in time;
(c) measuring the magnetic heading of a point having a known location with respect to the length of the streamer, such measurement being related in time to the travel time measurements;
(d) obtaining additional magnetic heading measurements;
(e) measuring the geophysical location of a reference point having a known location with respect to the length of the streamer, such measurement being related in time to travel time measurements;
(f) approximating with a curve the relative configuration of the streamer based solely on the travel time measurements, the approximation not being dependent on independent knowledge of the location of the reference signal detector;
(g) orienting the configured curve in a coordinate system related to magnetic north based on a plurality of magnetic heading measurements; and
(h) locating the curve in a geophysical coordinate system such that a point that corresponds, in relative location on the curve, to the location of the reference point on the streamer, corresponds in the geophysical coordinate system with the geophysical measurement for the reference point.

5. A method for determining the geophysical location of a seismic streamer as recited in claim 4 wherein the reference signal comprises an acoustic signal.

6. A method for determining the geophysical location of a seismic streamer as recited in claim 4 wherein the reference signal detector is laterally displaced from the seismic streamer such that the distances from the reference signal detector to the reference signal sources are as uniform as possible and are an order of magnitude greater than the distance between the reference signal sources.

* * * * *